(12) United States Patent
Kim et al.

(10) Patent No.: US 7,020,602 B1
(45) Date of Patent: Mar. 28, 2006

(54) NATIVE LANGUAGE DOMAIN NAME REGISTRATION AND USAGE

(76) Inventors: Ki S. Kim, 15101 Gravenstein Way, Gaithersburg, MD (US) 20878-4700; Jiyul Yoo, 9437 Van Arsdale Dr., Vienna, VA (US) 22181-6117

(*) Notice: Subject to any disclaimer, the term of this patent is extended or adjusted under 35 U.S.C. 154(b) by 686 days.

(21) Appl. No.: 09/642,471

(22) Filed: Aug. 21, 2000

(51) Int. Cl.
G10L 21/00 (2006.01)
G06F 17/20 (2006.01)

(52) U.S. Cl. .................................................. 704/8
(58) Field of Classification Search .................. 704/8, 704/9; 709/218, 245, 228; 707/203, 3, 4
See application file for complete search history.

(56) References Cited

U.S. PATENT DOCUMENTS 5,900,871 A 5/1999 Atkin et al. ................ 345/334

(Continued)

FOREIGN PATENT DOCUMENTS

| CN | 1255987 A | 6/2000 |
|---|---|---|
| EP | 1 059 789 | 12/2000 |
| KR | 1020000024670 A | 5/2000 |
| KR | 1020000036344 A | 7/2000 |
| WO | WO 99/09726 A1 | 2/1999 |
| WO | WO 99/19814 A1 | 4/1999 |
| WO | WO 99/39280 A2 | 8/1999 |

OTHER PUBLICATIONS

"Present State of Japanese Language Domain Name", New Rule on the Internet, INTERNET Magazine No. 68, Impress Co. Ltd., Sep. 1, 2000, pp. 266-267 (w/translation).

Seng et al., "iDNS—The Next Big Step in the Internet Saga", I-DNS.net International, Inc., Menlo Park, U.S., Dec. 1999, http://web.archive.org/web20000816011420/wwwidns.net/download/aboutus/iDNS Technology White Paper. pdf, pp. 1-4.

Dürst, Internationalization of Domain Names, IETF Internet Draft, <draft-duerst-dns-i18n-00.txt., Zurich, Dec. 10, 1996, pp. 1-3.

*Primary Examiner*—Susan McFadden
(74) *Attorney, Agent, or Firm*—Rothwell, Figg, Ernest & Manbeck (57) ABSTRACT

A domain name system includes a native language domain name registrar, which receives a native language domain name registration request. The native language domain name comprises at least one non-alphanumeric character not included in the allowable character set for domain name registration, i.e., the English alphabets A through Z, the Arabic numbers 0 through 9 and the hyphen "-". Each of the non-alphanumeric characters is converted to a string of alphanumeric characters to produce an alphanumeric domain name comprised of strings of alphanumeric characters uniquely representing the native language domain name being requested to be registered. The resulting alphanumeric domain name is registered with the domain name registration system, and is used in the domain name/IP address entry in the domain name server (DNS). An algorithm based conversion between each of the native language character and the corresponding alphanumeric character string is used to maintain a unique correspondence between a native language character and the corresponding alphanumeric character string. The same algorithm may be provided to the web browsers installed on the computer of a world-wideweb (WWW) user to convert native language domain names to the corresponding alphanumeric domain names, which are ultimately used for domain name lookup process during the respective WWW browse sessions.

16 Claims, 5 Drawing Sheets

U.S. PATENT DOCUMENTS

| | | |
|---|---|---|
| 5,974,453 A | 10/1999 | Andersen et al. ............ 709/220 |
| 6,081,774 A * | 6/2000 | de Hita et al. ................... 704/9 |
| 6,125,395 A * | 9/2000 | Rosenberg et al. ......... 709/228 |
| 6,298,341 B1 * | 10/2001 | Mann et al. .................... 707/3 |
| 6,338,082 B1 * | 1/2002 | Schneider .................... 709/203 |
| 6,519,589 B1 * | 2/2003 | Mann et al. .................... 707/3 |
| 6,560,634 B1 * | 5/2003 | Broadhurst ................. 709/203 |
| 6,738,827 B1 * | 5/2004 | Abir ............................ 709/245 |

* cited by examiner

NATIVE LANGUAGE DOMAIN NAME REGISTRATION AND USAGE

FIELD OF THE INVENTION

The present invention relates generally to communications networks. More particularly, the present invention relates to a method and apparatus for accommodating non-English language naming system to address and to direct accesses of entities of a communication network, particularly in the world-wide-web (WWW).

BACKGROUND OF THE INVENTION

The Internet, particularly the world-wide-web (WWW), provides a plethora of information sources, each of which offers useful information, goods and services, typically in the form of hyper-text mark-up language (HTML) pages (web pages), to users of the vast computer network. As it is well known, typically, a user utilizes a web browser, e.g., the NAVIGATOR® from the Netscape Communications Corporation of Mountain View, Calif., USA, or the INTERNET EXPLORER® from the Microsoft Corporation of Redmond, Wash., USA, installed on his/her computer to access a desired web page.

In order to access a particular web page, the user web browser must know the address of the desired destination web site within the network, i.e., the Internet. In particular, in the case of the WWW, the addresses are referred to as the Internet Protocol (IP) addresses. An IP address has a numeric format, e.g., 123.456.78.9. Each server hosting a website in the WWW is given a unique IP address.

However, as the number of web pages in the WWW (already in the hundreds of billions) rapidly increases, a more intuitive addressing convention that uses alpha-numeric aliases that can be more easily remembered is devised. An address according to the newly devised addressing system is commonly referred to as an Universal Resource Locator (URL), which typically has a syntax, "protocol://www.domain-name.domain". The protocol may be, e.g., hypertext transfer protocol (HTTP) for WWW. The domain specifies which of the high-level division of the entire Internet, the addressee belongs to, and can be, for example, "com", "org", "net" or the like (domains in countries other than the United States may include the country indicator, e.g., co.uk, which indicates a commercial domain in the United Kingdom). The domain-name and the domain fields together serve as the alias for the actual IP address. The domain-name may be arranged as a plurality of sub names, e.g., "subname 1.subname 2 . . . subname n." For example, an URL, http://www.xyz.com specifies a server in the world-wide-web hosting a web site for the xyz company.

A special server, called a domain name server (DNS), placed in the Internet maintains a global directory that maps domain names, e.g., the "xyz.com", to the corresponding actual IP addresses, e.g., 123.456.78.9, of the server hosting the web site for the xyz company. The DNS server may be more than one physically separate computers, and may be organized in a hierarchical manner. When a user enters an URL in the web browser installed on the user computer, the web browser inquires the DNS server for the IP address associated with the particular URL. Once, the web browser obtains the IP address from the DNS server, a connection is established between the user web browser and the server application at that IP address.

There is a non-ambiguous one-to-one correspondence between each URL and its associated IP address. In order to ensure the integrity of the unique correspondence between an URL and the associated IP address, it must be ensured that no two different servers, having different IP address from each other, share the same URL. To that end, there is a registration system in place to ensure only one registrant is assigned a particular "domain name". Presently, the authority for the registration system is with a non-profit organization, called the Internet Corporation for Assigned Names and Numbers (ICANN). Also at the present time, only one registrar for each of the domains are allowed to accept registration of domain names. For example, in the case of the ".com", "org" and the ".net" domains, the Network Solutions, Inc. (NSI), of Herndon, Va., USA, is the only authorized registrar for domain names. Once, a registrant registers a domain name with an authorized registrar, e.g., registering a ".com" domain name with NSI, no other entity may register the same domain name. Once a domain name is registered, the DNS directory is updated with a new entry assigning the newly registered domain name to the registrant's web hosting server IP address.

While the URL system and domain name registration system have greatly improved the convenience of addressing convention over the numerical IP address system, the current system is very inconvenient particularly for users of the Internet in non-English speaking countries. Because, heretofore, each character of all domain names were required to be in the form of alphanumeric character, (e.g., a character from A–Z, a number from 0–9, or perhaps a hyphen "-"), users of non-English speaking countries were forced to attempt to spell their native language words using English alpha-numeric characters. Unfortunately, because the English alphabet is inadequate in representing each and every possible phonetic sound of every language, a foreign language (a non-English native language) word may be spelled several different ways using English alphabets, often times, none of which can truly represent the native pronunciation of the word. For example, a Korean speaking Internet user may try to phonetically spell the Korean word, "가나다", which is roughly equivalent to "ABC" in English, as, inter alia, "Kanada", "Ganada" or even "Ghanahdah" (many other spelling may be possible).

The above multiple spelling possibility problem creates numerous sources of confusions, frustrations and inconveniences when exchanging URL information between users of the WWW in those non-English speaking countries. Frequently, when providing an URL information, rather than simply uttering the whole word, the entire domain name must be spelled out one character at a time, making it extremely inconvenient to those not well versed in English. Moreover, businesses in those non-English speaking countries, even when a suitable native word that perfectly describes the services offered by a particular business, opt not to use the word as the domain name for the business because of the likeliness of confusion with respect to the English alpha-numeric spelling of the word.

Furthermore, the requirement that a non-English speaking WWW user must remember an English word in-and-of-itself is an inconvenience that makes the current domain name system less desirable.

There is thus a need for a method of and system for registration and usage of native language domain names, which may comprise one or more non-English alpha-numeric characters.

SUMMARY OF THE INVENTION

In accordance with the principles of the present invention, a method of registering a domain name comprises receiving a request for registration of a native language domain name, the native language domain name including at least one non-alphanumeric character, converting each of the at least one non-alphanumeric character to a corresponding alphanumeric character to produce an alphanumeric domain name, and registering the alphanumeric domain name with an authorized alphanumeric domain name registrar.

In addition, in accordance with the principles of the present invention, a method of establishing a communication link between a user computer and a destination website over a world wide web network comprises receiving a universal resource locator of the destination website, the universal resource locator having a native language domain name that comprises at least one non-alphanumeric character, converting each of the at least one non-alphanumeric character to a corresponding alphanumeric character to produce an alphanumeric domain name, performing a domain name server inquiry using the alphanumeric domain name to obtain an Internet Protocol (IP) address of the destination website, and establishing the communication link between the user computer and the destination website using the Internet Protocol (IP) address.

Moreover, in accordance with the principles of the present invention, A domain name registration system comprises a native language domain name registrar configured to receive a request for registration of a native language domain name, the native language domain name including at least one non-alphanumeric character, wherein the native language domain name registrar is configured to convert each of the at least one non-alphanumeric character to a corresponding alphanumeric character to produce an alphanumeric domain name, and is further configured to register the alphanumeric domain name with an authorized alphanumeric domain name registrar.

BRIEF DESCRIPTION OF THE DRAWINGS

Features and advantages of the present invention will become apparent to those skilled in the art from the following description with reference to the drawings, in which.

DETAILED DESCRIPTION OF PREFERRED EMBODIMENTS

For simplicity and illustrative purposes, the principles of the present invention are described by referring mainly to registration and usage of Korean domain names. However, one of ordinary skill in the art would readily recognize that the same principles are equally applicable to and can be implemented for domain names in any language.

In accordance with the principles of the present invention, a domain name system includes a native language domain name registrar, which receives a native language domain name registration request. The native language domain name comprises at least one non-alphanumeric character not included in the allowable character set for domain name registration, i.e., the English alphabets A through Z, the Arabic numbers 0 through 9 and the hyphen "-". Each of the non-alphanumeric characters is converted to a string of alphanumeric characters to produce a alphanumeric domain name comprised of strings of alphanumeric characters uniquely representing the native language domain name being requested to be registered. The resulting alphanumeric domain name is registered with the domain name registration system, and is used in the domain name/IP address entry in the domain name server (DNS). An algorithm based conversion between each of the native language character and the corresponding alphanumeric character string to maintain a unique correspondence between a native language character and the corresponding alphanumeric character string. The same algorithm may be provided to the web browsers installed on the computer of a world-wide-web (WWW) user to convert native language domain names to the corresponding alphanumeric domain names, which are ultimately used for domain name lookup process during the respective WWW browse sessions.

Figure 1:
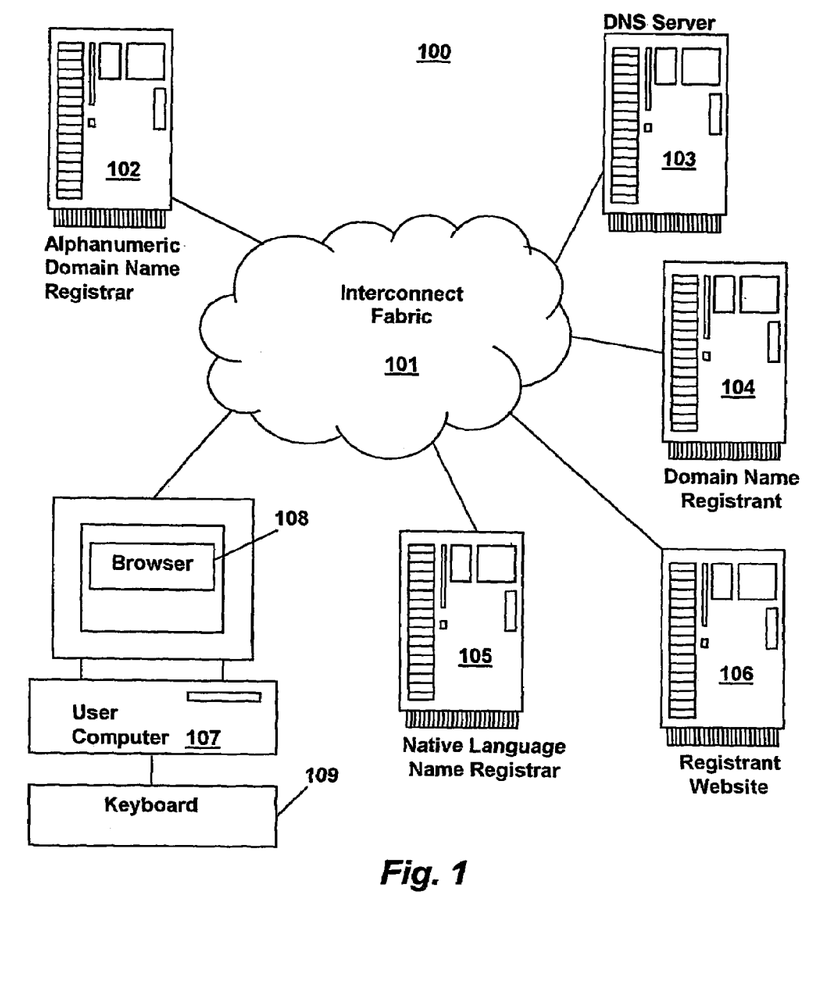
FIG. 1 shows an exemplary embodiment of the Internet including the native domain name registration and usage system, in accordance with the principles of the present invention.

In particular, FIG. 1 is a block diagram showing the relevant portions of the world-wide-web (WWW) network 100 in accordance with an embodiment of the present invention. The WWW network comprises an interconnect fabric 101, through which each of the Alphanumeric Domain Name Registrar (ADNR) 102, the DNS server 103, a Domain Name Registrant (DNR) 104, a Native Language Domain Name Registrar (NLDNR) 105 and a User computer 107 communicate with each other.

The interconnect fabric 101 is a wide area network (WAN), and may comprise a plurality of computers, routers, gateways and/or portions of the Public Switched Telephone Network (PSTN), as known to those familiar with the architecture of the Internet.

The ADNR 102 is the authorized registrar of domain names for a particular domain. For example, at the present time, in the case of the ".com", ".org" and the ".net" domains, the Network Solutions, Inc. (NSI), of Herndon, Va., USA, is the only authorized registrar for domain names. Although, by way of an example, only one ADNR 102 is shown in FIG. 1, in practice, there are a number of ADNRs 102, each of which may serve as the registrar for a particular domain, e.g., ".gov", ".co.uk", "co.kr" and the like.

A DNR 104 may be an individual or a business concern that desires to obtain a "web address" for its website 106 being hosted by a hosting server (not shwon) having an IP address, e.g., 123.456.78.9. Although by way of example, only one DNR 104 is shown, there may be any number of NDRs 104. Once, a DNR 104 registers a domain name with an authorized ADNR 102, e.g., registering a ".com" domain name with NSI, no other entity may register the same domain name. In response to a request from a DNR 104 for registration of a domain name, e.g., "xyz.com", the ADNR 102 reserves the requested domain name for the exclusive use by the requesting DNR 104. The requesting DNR 104 may opt to "park" the newly registered domain name until its website 106 is developed and launched by releasing to the rest of the WWW. The website when launched is typically placed on a web hosting server (not shown). Once a domain name is registered, and the associated website is launched, the DNS directory in the DNS server 103 is updated with a new entry assigning the newly registered domain name to the registrant's web hosting server IP address.

In accordance with the principles of the present invention, the WWW 100 may include a NLDNR 105 for receiving a request for registration of a native language domain name. A native language domain name in accordance with the present invention, and for the purpose of description thereof herein, is defined as a domain name having a string of characters, at least one of which being a non-alphanumeric character, i.e., a character not in the set of characters currently allowed in domain names, namely the English alphabets, A, B, C, D, E, F, G, H, I, J, K, L, M, N, O, P, Q, R, S, T, U, V, W, X, Y and Z (in either upper or lower case), the Arabic numbers, 0, 1, 2, 3, 4, 5, 6, 7, 8, 9, and the hyphen "-".

For example, NLDNR 105 may receive from the DNR 104 a request for registration of a native language domain name, "가나다.com", "가나다," being a Korean writing, and each of the characters, "가", ", "나" and "다" being a non-alphanumeric character. According to an embodiment of the present invention, upon receiving the request, the NLDNR 105 converts the native language domain name to an alphanumeric domain name according to a standard conversion algorithm preferably adapted by the entire WWW community. The conversion algorithm will be described in more detail later. The NLDNR 105 reserves the native domain name for the exclusive use by the requesting DNR 104, and registers the converted alphanumeric domain name corresponding to the native language domain name with the ADNR 102. The ADNR 102 reserves the requested alphanumeric domain name, and updates the DNS directory in the DNS server 103 with a new entry assigning the newly registered alphanumeric domain name to the registrant's web hosting server IP address as previously explained. Although by way of example, the NLDNR 105 and the ADNR 102 are shown as separate entities, it should be understood that they may be one and the same entity in practice.

A WWW user may use his/her user computer 107 to conduct a WWW browse session using a web browser 108, e.g., the NAVIGATOR® from the Netscape Communications Corporation of Mountain View, Calif., USA, or the INTERNET EXPLORER® from the Microsoft Corporation of Redmond, Wash., USA, installed the user computer 108. In the case of a user in a non-English speaking countries, the user may be using a version of the web browser 108, which allows entry of inputs and display of information in the user's native language, e.g. in Korean. The user computer 107 is typically equipped with a keyboard 109, which, in the case of a non-English speaking user, provides one or more key buttons for entering the user's native language characters.

In accordance with an embodiment of the present invention, the web browser 108 may, in the case of a native language version, include a conversion module which converts a native language domain name entered by the user using the keyboard 109 to the corresponding alphanumeric domain name in the same manner as the NLDNR 105 as mentioned above, and will further be described later. The conversion module thus allows a non-English speaking user to type in a URL in his/her native language to reach the desired website in the WWW.

Figure 2A:
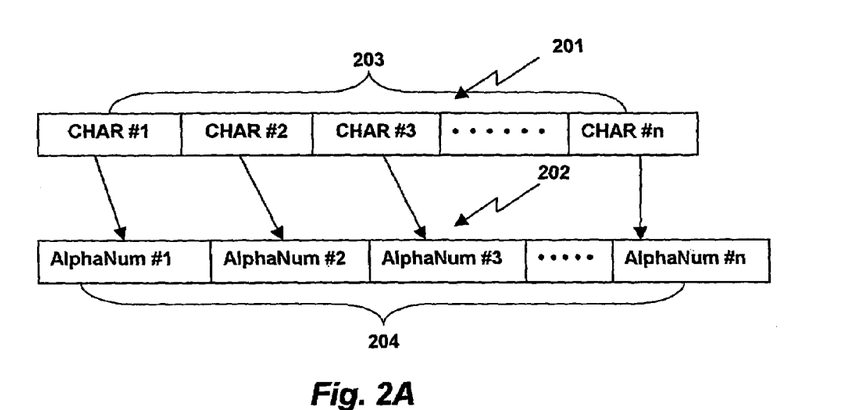
FIG. 2A shows an exemplary embodiment of the relevant portions of native language domain name format and the format of the unique corresponding alpha-numeric domain name for registration, in accordance with the principles of the present invention.
Figure 2B:
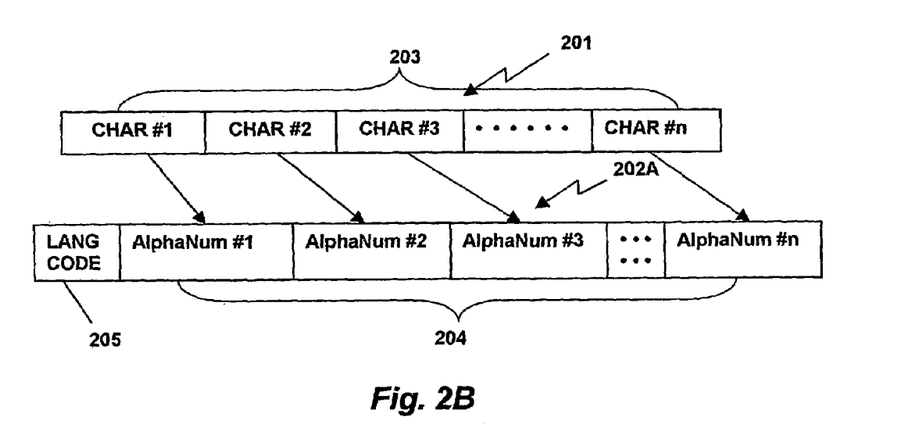
FIG. 2B shows an alternative exemplary embodiment of the relevant portions of native language domain name format and the format of the corresponding unique alphanumeric domain name that includes a language code field, for registration, in accordance with the principles of the present invention.

The native language domain name to the corresponding alphanumeric domain name conversion process will not be described in more detail with references to FIGS. 2A and 2B. FIG. 2A shows an exemplary embodiment of the relevant portions of the formats of a native language domain name 201 and its corresponding alphanumeric domain name 202. In particular, the native language domain name 201 may be a string of n characters 203, i.e., CHAR 1, CHAR 2, CHAR 3 . . . CHAR n, at least one of the n characters being a non-alphanumeric character. Any one of the characters of the native domain name 201 may be an alphanumeric character so long as the native language domain name 201 comprises at least one non-alphanumeric character.

A non-alphanumeric character may be, e.g., any characters in any language available on the keyboard of the language of the particular user. For a particular native language, e.g., Korean, Japanese, French, Chinese or the like, each of possible written character is assigned a unique alphanumeric character(s). This assignment of alphanumeric characters to native language characters, in a preferred embodiment of the present invention, is based on the UNICODE™, available from the Unicode Consortium of Mountain View, Calif., USA, and from their website whose URL is www.unicode.org.

According to the UNICODE™ standard, each possible character of each of native languages is assigned a two byte code, and a byte range is assigned to each language. For example, and by way of example only, the range assignments for a selective exemplary languages according to the UNICODE™ standard are illustrated below in table 1.

TABLE I

| NATIVE LANGUAGE | RANGE |
| --- | --- |
| Alphabetic Presentation Forms | FB00–FB4F |
| Arabic Presentation Forms-A | FB50–FDFF |
| Arabic Presentation Forms-B | FE70–FEFF |
| Arabic | 0600–06FF |
| Armenian | 0530–058F |
| Latin Extended-A | 0100–017F |
| Latin Extended-B | 0180–024F |
| C1 Controls and Latin-1 Supplement | 0080–00FF |
| C0 Controls and Basic Latin | 0000–007F |
| Bengali | 0980–09FF |
| Bopomofo Extended | 31A0–31BF |
| Bopomofo | 3100–312F |
| Cherokee | 13A0–13FF |
| CJK Compatibility Forms | FE30–FE4F |
| CJK Compatibility Ideographs | F900–FAFF |
| CJK Compatibility | 3300–33FF |
| CJK Unified Ideographs Extension A | 3400–4DBF |
| CJK Radicals Supplement | 2E80–2EFF |
| CJK Symbols and Punctuation | 3000–303F |
| CJK Unified Ideographs | 4E00–9FAF |
| Cyrillic | 0400–04FF |
| Devanagari | 0900–097F |
| Ethiopic | 1200–137F |
| Georgian | 10A0–10FF |
| Greek Extended | 1F00–1FFF |
| Greek and Coptic | 0370–03FF |
| Gujarati | 0A80–0AFF |

TABLE I-continued

| NATIVE LANGUAGE | RANGE |
| --- | --- |
| Gurmukhi | 0A00–0A7F |
| Korean Compatibility Jamo | 3130–318F |
| Korean Jamo | 1100–11FF |
| Korean Syllables | AC00–D7AF |
| Hebrew | 0590–05FF |
| Japanese Hiragana | 3040–309F |
| Japanese Katakana | 30A0–30FF |

As can be seen from the above Table 1, given a string of two byte codes, and seeing that all of the two byte codes fall within a predetermined range, a web browser 108 equipped with a conversion module can recognize the language in which to display the domain name. For example, a native language domain name 201 in Korean, "가나다", comprises three characters, "가", "나" and "다", which according to the UNICODE™ standard, will be encoded as the corresponding alphanumeric strings 204, "0AC0", "8B09" and "4B2E", respectively. Thus, the Korean domain name 201, "가나다", is converted to an alphanumeric domain name 202 having twelve characters, "0AC08B094B2E". Each two bytes of the alphanumeric domain name 204 is within the range AC00–D7AF, and thus the web browser 108 would recognize that the domain name is to be displayed as a Korean syllable according to the UNICODE™ standard.

The current domain name system allows an alphanumeric domain name to have a maximum of sixty-seven (67) characters. Thus, a native language domain name may have up to sixteen (16) native language characters. While an alphanumeric domain name 202 may comprise any number of characters from four to sixty-seven, in an embodiment of the present invention, the alphanumeric domain name 202 has a fixed character length, e.g., sixty-four (64) characters. When a native language domain name being requested has less than 16 native language characters, an appropriate number of "0s" are filled in to obtain an alphanumeric domain name that is 64 characters long. For example, in this exemplary embodiment, the native language domain name 201, "가나다", will be converted to an alphanumeric domain name 202, "0AC08B094B2E00000000000000000000000000000000000000000000000000000000". In addition, the conversion module of the web browser 108 is made to know to ignore the null bytes, "00". The long domain name, e.g., 64 characters long, are not popularly used, and thus much of the name space in a domain may be preserved for use by registrants desiring English word domain names.

While in the above description, the native language domain name to the corresponding alphanumeric domain name is illustrated using the UNICODE™ standard, it should be understood that any other conversion algorithms assigning each character of each of the languages a unique alphanumeric character string of any byte length.

FIG. 2B shows the format of the alphanumeric domain name 202A according to an alternative embodiment of the present invention. In this embodiment, the alphanumeric domain name 202A is similar to the alphanumeric domain name 202, except that it has at least one additional language code byte 205, which may be used to indicate the language in which the domain name is to be displayed.

It should be understood that, although by way of example only, a native domain name is illustrated using a Korean domain name, any language domain name may be converted to alphanumeric domain names in accordance with the principles of the present invention described above.

Figure 3:
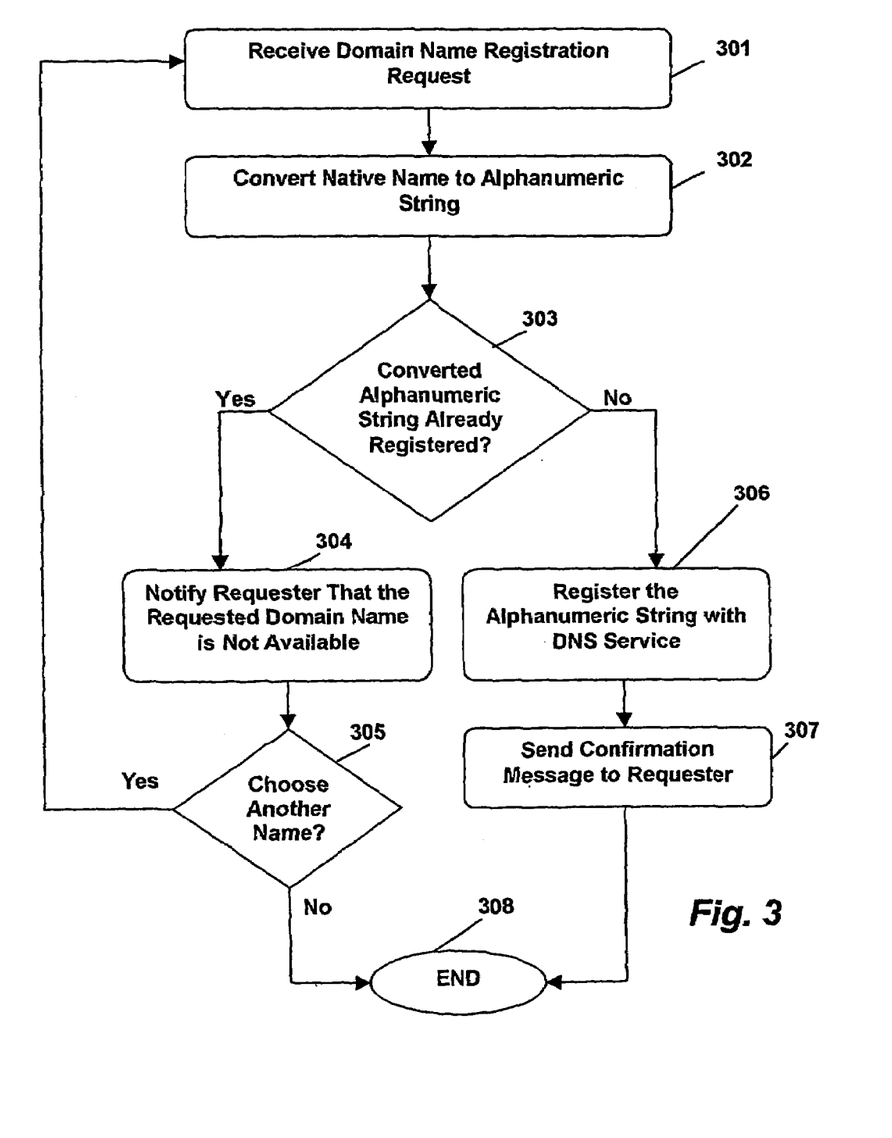
FIG. 3 shows a flow chart depicting an illustrative exemplary embodiment of a process of registering a native language domain name, in accordance with the principles of the present invention.

Referring mainly to FIG. 3, the native domain name registration process in accordance with the principles of the present invention will now be described. As shown in FIG. 3, when a request for registration of a native language domain name, e.g., "가나다.com" is received from a DNR 104 in step 301, the NLDNR 105, in step 302, converts the native language domain name to an alphanumeric domain name, e.g., the "0AC08B094B2E000000000000000000000000000000000000000000000000000000", in a manner previously described.

In step 303, the NLDNR 105 makes an inquiry to the ADNR 102 whether the converted alphanumeric domain name is available for registration by the present requesting registrant, DNR 104. If the requested alphanumeric domain name is available for registration, i.e., no other registrant has previously registered the same domain name, the NLDNR 105 registers the requested alphanumeric domain name with the ADNR 102 in step 306, and sends, in step 307, a confirmation message to the requester, DNR 104 indicating that the requested native domain name is now registered and reserved for the requester's exclusive use. The registration process ends at step 308.

If, on the other hand, the converted alphanumeric domain name is already registered by another registrant, the NLDNR 105, in step 304, notifies the present requester that the requested native language domain name is unavailable for registration, and in step 305, asks the requester if the requester wishes to select another native domain name for registration, and if the requester chooses another native language domain name, the process returns to repeat the process starting from the step 301. If, on the other hand, the requester opts not to choose another domain name for registration, the process ends in step 308.

Figure 4:
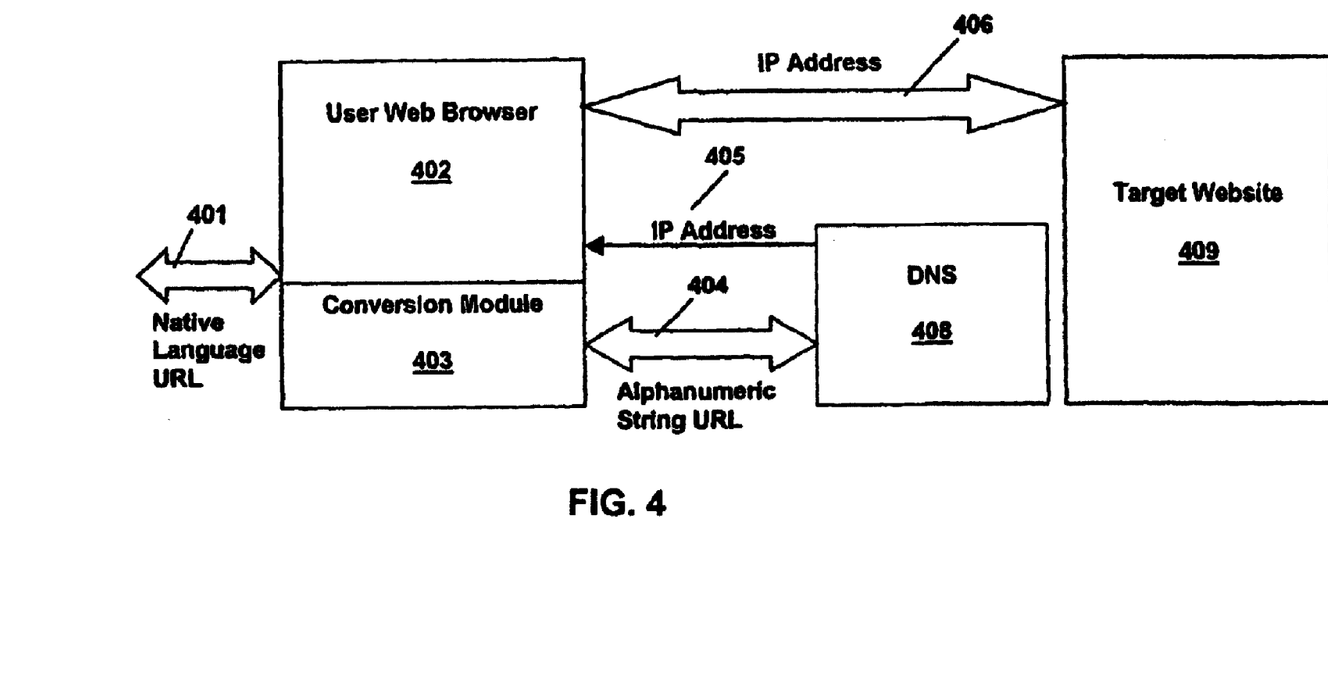
FIG. 4 shows an illustrative exemplary embodiment of communications between a user web browser, a domain name service (DNS) server and the destination web site, in accordance with the principles of the present invention.

Once a native language domain name is registered as described above, and once the registrant releases its website by placing it on a web hosting server, the registrant's website may be reached by users of the WWW. FIG. 4 shows the communications between entities of the WWW to allow a user of the WWW to reach the website 409 having a registered native language domain name.

Figure 5:
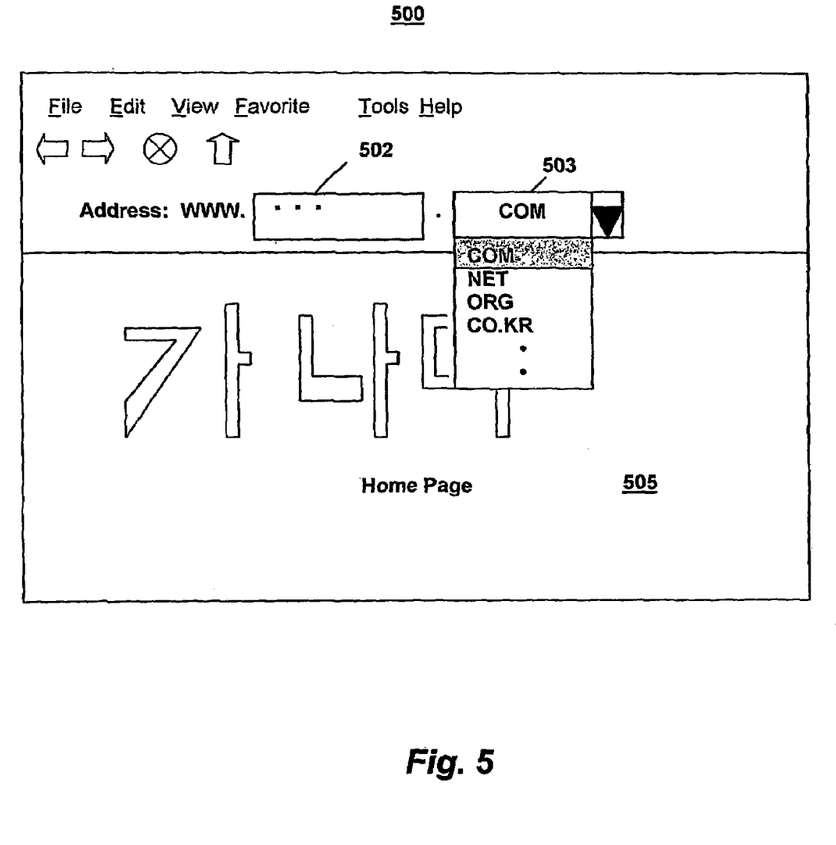
FIG. 5 shows an illustrative exemplary embodiment of web browser display screen, in accordance with the principles of the present invention.

A WWW user, e.g., in a non-English speaking country, is provided with a web browser 402, which is capable of receiving from the keyboard (not shown), and displaying one or more native language characters, and which includes a conversion module 403. The conversion module 403 performs the native language domain name to the corresponding alphanumeric domain name as described above. An exemplary screen display 500 of the web browser 402 is shown in FIG. 5, in which is shown the domain name entry/display window 502, into which a user may enter a native language domain name, e.g., "가나다". The web browser screen 500 also includes a domain selection box, which provides a list of possible domains, e.g., ".com", ".net", ".org", ".co.kr" or the like as well known to those familiar with WWW. The domain name and the selected domain together form an URL, e.g., in this example, http://www.가나다.com.

Referring to FIG. 4, when a user enters the native language URL 401, e.g., the http://www.가나다.com through the web browser screen 500, the conversion module 403 of the web browser 402 converts the native name domain name into an alphanumeric domain name, in a manner previously described, to formulate the corresponding alphanumeric URL 404, e.g., http://www.0AC08B094B2E000000000000000000000000000000000000000000000000000000.com, and sends the same to the DNS server 408. The DNS server 408 performs a look up operation to find the IP address corresponding to the alphanumeric URL, and sends the found IP address 405 to the web browser 402. The web browser 402 then uses the IP address 405 to establish a communication link between the user web browser 402 and the destination web site 409, through which the user may access the information and/or service offered by the web site 409.

Once the communication link 406 is established, a hyper text markup language (HTML) page 505 of the web site 409 is displayed in the user web browser screen 500, as shown in FIG. 5.

While the invention has been described with reference to the exemplary embodiments thereof, those skilled in the art will be able to make various modifications to the described embodiments of the invention without departing from the true spirit and scope of the invention.

What is claimed is:

1. A method of registering a domain name, comprising:
receiving from a registrant a request for registration of a native language domain name, said native language domain name including at least one non-alphanumeric character;
converting each of said at least one non-alphanumeric character to a corresponding alphanumeric character to produce a converted alphanumeric domain name; and
registering said converted alphanumeric domain name with an authorized alphanumeric domain name registrar, said authorized alphanumeric domain name registrar being one of one or more registrar that maintain a database of domain names usable in the Internet so as to ensure there are no duplicative domain name assignments, wherein said step of registering comprises adding an entry in a domain name server database, said added entry defining unique correspondence relationship between said converted alphanumeric domain name and an Internet Protocol (IP) address of a web site of said registrant.

2. The method of registering a domain name in accordance with claim 1, further comprising:
reserving said native language domain name for an exclusive use by said registrant.

3. The method of registering a domain name in accordance with claim 1, further comprising:
determining whether said converted alphanumeric domain name was already registered by another entity other than said registrant.

4. The method of registering a domain name in accordance with claim 1, wherein:
each of said at least one non-alphanumeric character is converted to said corresponding alphanumeric character based on Unicode standard.

5. The method of registering a domain name in accordance with claim 1, further comprising:
sending, upon registration of said converted alphanumeric domain name, to said registrant a confirmation message indicating completion of registration of said native language domain name.

6. The method of registering a domain name in accordance with claim 1, wherein:
said alphanumeric domain name has a fixed number of character width.

7. The method of registering a domain name in accordance with claim 6, wherein:
said fixed number of character width is sixty-four.

8. A method of establishing a communication link between a user computer and a destination website over a world wide web network, comprising:
receiving a universal resource locator of said destination website, said universal resource locator having a native language domain name that comprises at least one non-alphanumeric character;
converting each of said at least one non-alphanumeric character to a corresponding alphanumeric character to produce a converted alphanumeric domain name, said converted alphanumeric domain name being pre-registered with an authorized registrar based on a request for registration of said native language domain name;
performing a domain name server inquiry using said converted alphanumeric domain name to obtain an Internet Protocol (IP) address of said destination website, said domain name server inquiry comprises querying a database of pre-registered domain names usable in the Internet, said database being maintained so as to ensure there are no duplicative domain name assignments; and
establishing said communication link between said user computer and said destination website using said Internet Protocol (IP) address.

9. The method of establishing said communication link between said user computer and said destination website in accordance with claim 8, wherein:
each of said at least one non-alphanumeric character is converted to said corresponding alphanumeric character based on Unicode standard.

10. The method of establishing said communication link between said user computer and said destination website in accordance with claim 8, wherein:
said alphanumeric domain name has a fixed number of character width.

11. The method of establishing said communication link between said user computer and said destination website in accordance with claim 10, wherein:
said fixed number of character width is sixty-four.

12. A domain name registration system, comprising:
a native language domain name registrar configured to receive a request for registration of a native language domain name, said native language domain name including at least one non-alphanumeric character;
wherein said native language domain name registrar is configured to convert each of said at least one non-alphanumeric character to a corresponding alphanumeric character to produce a converted alphanumeric domain name, and is further configured to register said converted alphanumeric domain name with an authorized alphanumeric domain name registrar, said authorized alphanumeric domain name registrar being one of one or more registrar that maintain a database of domain names usable in the Internet so as to ensure there are no duplicative domain name assignment, said database of domain names having a plurality of entries defining unique correspondence relationships between a plurality of alphanumeric domain names and respective ones of a plurality of Internet Protocol (IP) addresses.

13. The domain name registration system according to claim 12, wherein:
said native language domain name registrar configured to convert each of said at least one non-alphanumeric character to said corresponding alphanumeric character in accordance with Unicode standard.

14. The domain name registration system according to claim 12, wherein:
said converted alphanumeric domain name has a fixed number of character width.

15. The domain name registration system according to claim 14, wherein:
said fixed number of character width is sixty-four.

16. The domain name registration system according to claim 12, wherein said converted alphanumeric domain name comprising: at least one language code character.

* * * * *